United States Patent [19]
Stamatakis

[11] Patent Number: 5,553,915
[45] Date of Patent: Sep. 10, 1996

[54] ATTACHABLE PASSENGER SEAT FOR TWO-WHEELED VEHICLE

[76] Inventor: Robert Stamatakis, Am Dicken Turm 3, D-97082, Würzburg, Germany

[21] Appl. No.: 299,374

[22] Filed: Sep. 1, 1994

[30] Foreign Application Priority Data

Sep. 2, 1993 [DE] Germany .............................. 9313230 U
Dec. 15, 1993 [DE] Germany .............................. 9319246 U

[51] Int. Cl.$^6$ ...................................................... B60N 2/38
[52] U.S. Cl. ................... 297/195.13; 297/183.9; 297/215.11; 297/352
[58] Field of Search ....................... 297/195.13, 4, 297/183.9, 183.7, 183.1, 195.12, 195.1, 215.11, 215.12, 215.1, 230.1, 250.1, 243, 352

[56] References Cited

U.S. PATENT DOCUMENTS

| | | | |
|---|---|---|---|
| 409,964 | 8/1889 | Harvey | 297/243 X |
| 460,072 | 9/1891 | Jones | 297/243 X |
| 2,905,953 | 9/1959 | Windl | 297/352 X |
| 3,712,670 | 1/1973 | Svehla et al. | 297/250.1 X |
| 3,746,392 | 7/1973 | German | 297/195.13 X |
| 3,940,166 | 2/1976 | Smithea | 297/215.11 |
| 4,195,879 | 4/1980 | Miller | 297/250.1 X |
| 4,305,532 | 12/1981 | Reminger | 297/195.13 x |
| 4,779,924 | 10/1988 | Rudel | 297/195.13 |
| 4,854,638 | 8/1989 | Marcus et al. | 297/DIG. 2 X |
| 4,909,522 | 3/1990 | Flanigan | . |

FOREIGN PATENT DOCUMENTS

| | | |
|---|---|---|
| 2539643 | 3/1976 | Germany . |
| 9108807.0 | 12/1991 | Germany . |
| 9201550.6 | 5/1992 | Germany . |
| 2172799 | 10/1986 | United Kingdom . |

*Primary Examiner*—Milton Nelson, Jr.
*Attorney, Agent, or Firm*—Evenson, McKeown, Edwards & Lenahan, P.L.L.C.

[57] ABSTRACT

An attachable seat which can be fastened to a seat of a motorcycle or a motor scooter and has a flexible seat area which rests on the seat and connects two lateral pieces which partially reach over the seat and a backrest. A belt is attached to the lateral pieces and can be guided underneath the seat in a direction diagonal to the seat.

10 Claims, 2 Drawing Sheets

ATTACHABLE PASSENGER SEAT FOR TWO-WHEELED VEHICLE

BACKGROUND OF THE INVENTION

This invention describes an attachable seat for installation on the seat of a motorcycle or motor scooter especially for small children. The attachable seat, which has a backrest, can be fastened to the seat with the help of a belt.

An attachable seat as described above is the subject of DE-A25 39 643. The known attachable seat has a flexible seat which is secured on the seat with the help of the belts on either side of the seat and fixed attachment elements. The back rest is attached to the flexible seat at its lower edge only so that it can be folded down. The upright position, which is necessary to support the person who sits in the attachable seat, is achieved as follows: the driver of the motorcycle or motor scooter fastens the two ends of a belt which is attached to the backrest around his own body. The belt, which is attached to the backrest, thus is wrapped around the driver and the passenger.

This known attachable seat can only be fastened to seats which have the required fastening element on each side. It is therefore not suitable for motorcycles and motor scooters. Additionally the passenger is pressed against the back of the driver because of the belt which is attached to the backrest. Often this is not very pleasant. Before the driver and the passenger get off, the driver must release this belt which causes the backrest to fall. If the passenger is a child, he no longer has any support at this point. If the driver pushes his vehicle from the sidewalk to the street, for example, a child can easily fall from the seat.

U.S. Pat. No. 4,909,522 has an attachable seat for a bicycle seat which has a rigid backrest and two lateral parts which reach downward over the bicycle seat. The attachable seat is secured on the bicycle seat by the lateral parts which enclose the two side edges of the bicycle seat which are directed downward. Since a bicycle seat widens from front to backrest and its sides increase in height toward the backrest, the attachable seat can simply be pushed onto the bicycle seat from the front. The attachable seat in accordance with U.S. Pat. No. 4,909,522 is only a backrest for the user of the bicycle seat. A passenger, especially a child, cannot be taken along.

SUMMARY OF THE INVENTION

The present invention addresses the problem of creating an attachable seat for installation on the seat of a motorcycle or motor scooter which can be fastened on a seat without changing the seat and which provides safe support for a passenger.

The attachable seat in accordance with the invention has the following features which solve this problem: the attachable seat has two lateral parts which are connected by the seat area and the backrest and which partially reach over the seat of the vehicle, a belt which is fastened to these lateral parts which can be run underneath the seat of the vehicle diagonally to the seat.

Such an attachable seat is simply placed from the top onto the back end of the vehicle seat. After the vehicle seat is tipped up, the belt which is supposed to fasten the attachable seat is run underneath the seat of the vehicle and is tightened. The lateral parts which reach over the seat of the vehicle on the side prevent the attachable seat from moving transversely to the seat of the vehicle. This means that the attachable seat can be installed easily without changing the vehicle seat or the motor cycle or motor scooter itself. The attachable seat in accordance with the invention is especially suitable for the use as a child seat which is attached to the seat of the vehicle. It provides secure support for the child although the child does not have to wear a seatbelt in the attachable seat. This is very advantageous for two-wheel vehicles in the case of an accident. Of course the attachable seat can be used for transporting luggage instead of children.

A flexible seat has advantages. The weight of the passenger pushes down the seat which in turn puts tension between the two lateral parts. This results in an additional cohesion on the seat of the vehicle.

If there is no luggage carrier or pillion bar for a passenger behind the seat of the vehicle which is taller than the backrest of the attachable seat, it is possible that the attachable seat, which is only secured by a belt which is tied around the seat of the vehicle, could slide off to the back. A simple way to prevent this from happening is to equip the lateral parts with another belt which is large enough to run around an area which is located in front and underneath the seat of the motorcycle or motor scooter.

Additionally the attachable seat can be secured against sliding to the front if there is a third belt on the backrest which fastens the attachable seat to a luggage carrier, a pillion bar or a mounting element located in the back of it. Such a model has advantages, especially if the attachable seat is a child's seat, and has a safety belt which buckles a child into the attachable seat. Such a belt on the backrest makes it possible to tie down the attachable seat to the front, underneath and to the back. This prevents the attachable seat from rocking.

The attachable seat is especially secured on the seat of the vehicle if the lateral parts which reach over the seat of the vehicle diverge in the direction of the seat of the vehicle. It is possible to secure the attachable seat from sliding to the front by extending the lower end of the backrest down so that it partially extends below the seat of the vehicle. This means that the bottom of the attachable seat is open to the front only and forms a type of bracket which fits the seat of the vehicle. In order to ensure easy handling of the attachable seat, each lateral part has a handle on the outside.

Foot rests can be attached on each side of the lateral parts. The distance to the backrest can be adjusted if the attachable seat has a foot rest belt which runs laterally to the vehicle seat and which has a foot rest on each side of the seat of the vehicle.

BRIEF DESCRIPTION OF THE DRAWING

Several different embodiments fall within the scope of this invention. In order to explain the invention and its basic principle in more detail, one embodiment described in the following specification making reference to the drawing wherein:

FIG. 1 shows part of a motor scooter having a body 1 to which a customary vehicle seat 2 is fastened which can be pivoted around a joint 3 which is located near its front edge so that its backside moves upward. This ability to pivot, which is customary in motor scooters, makes it possible to integrate a storage compartment into body 1 and a filler neck for fuel, both of which are not shown.

Figure 1:
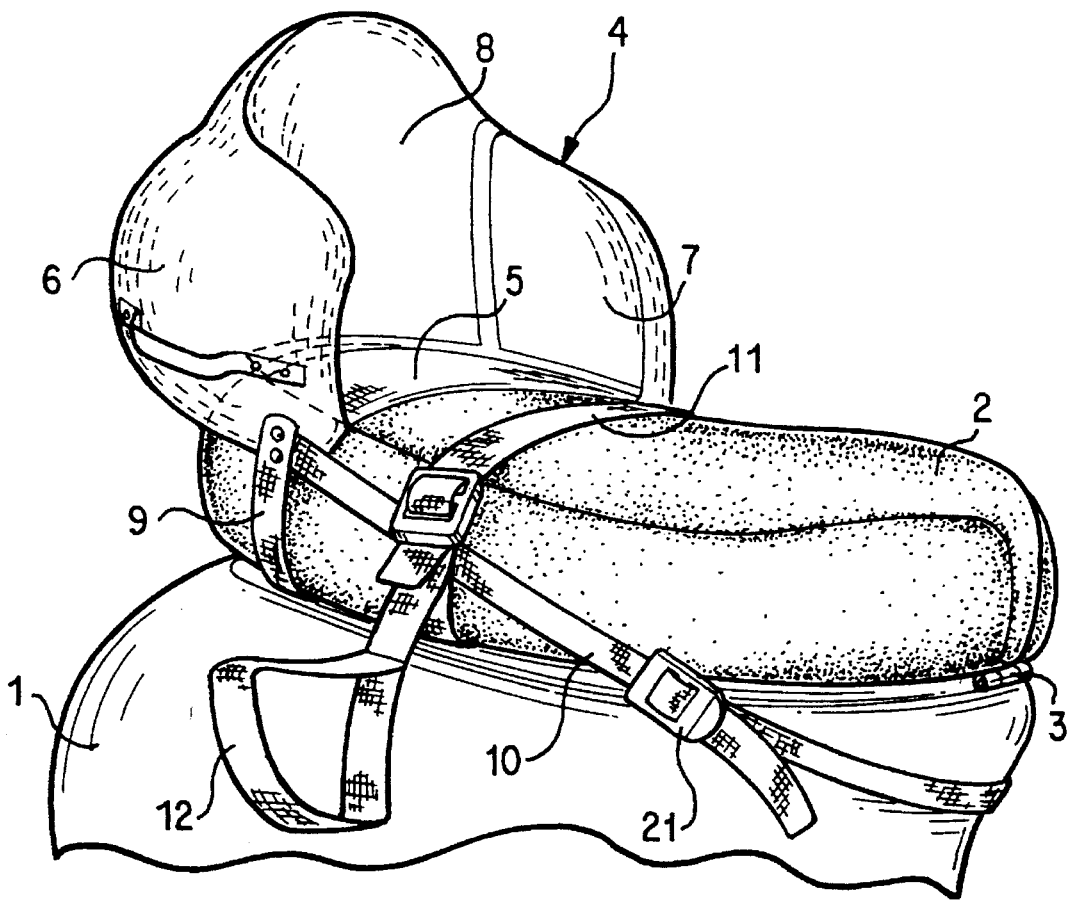
FIG. 1 is a perspective view showing part of a motor scooter with a seat and the attachable seat fastened to the seat in accordance with the invention from the front and one side.

Important for the invention is an attachable seat 4 which is fastened to the back end of the seat 2 of the vehicle. This attachable seat 4 has a flexible seat 5 which rests on the seat 2 of the vehicle and which connects two lateral parts 6, 7 and a rigid backrest 8. It is important for the invention that the lateral parts 6, 7 are extended downwardly past the upper surface of the seat 5 so that they touch the sides of the seat of the vehicle.

Figure 3:
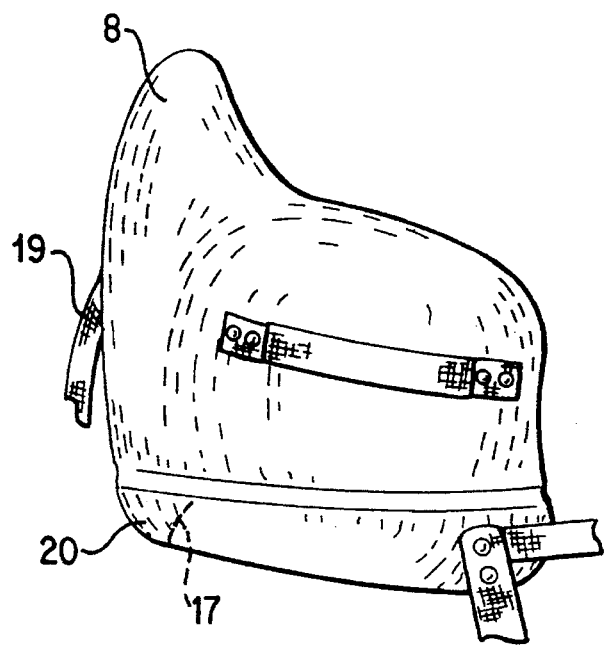
FIG. 3 is a side elevational view thereof.

The end of a belt 9 is attached to the lateral parts 6, 7 on the outside. The belt is wrapped around beneath the seat 2 of the vehicle. It secures the attachable seat 4 on the seat 2 of the vehicle. There is an additional belt 10 on the lateral parts 6, 7 which runs around the front part of the body 1 and prevents the attachable seat from sliding backwards. A foot rest safety belt 11 is wrapped around the seat of the vehicle in front of the seat 5. On each side of the seat 2 of the vehicle the foot rest has two foot rests 12 which consists of loops. All belts, 9, 10, 11 and a belt 19, which is shown in FIG. 3, are equipped with easy to handle buckles of which one buckle 21 is shown and positioned in FIG. 1.

Figure 2:
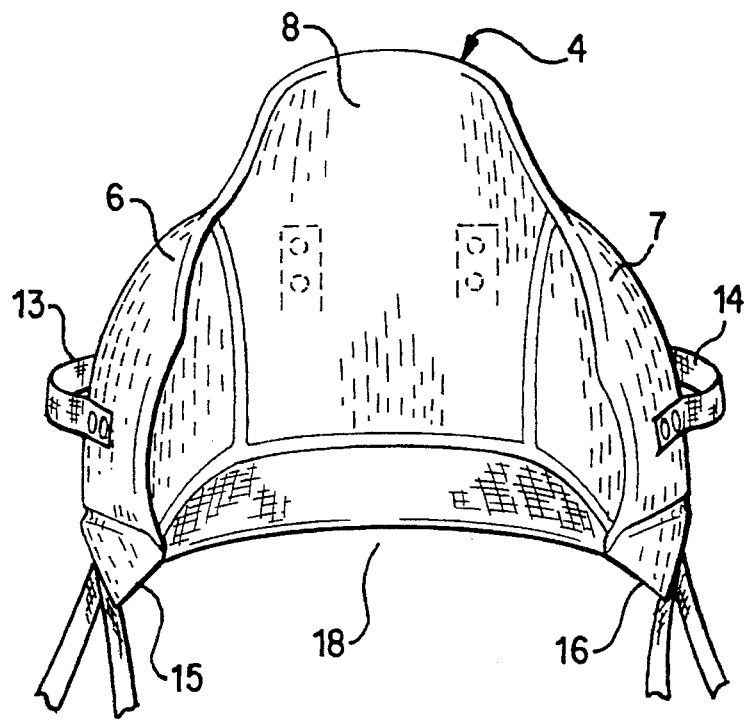
FIG. 2 is a front elevational view of the attachable seat of FIG. 1.

FIG. 2 shows that there is a handle 13, 14 on the outside of each lateral part 6, 7 of the attachable seat 4. This makes it possible to comfortably transport the attachable seat, in this case a child's seat. Additionally it can be seen that side pieces of the lateral parts 6, 7, which go past the seat of the vehicle 2, shown in FIG. 1, have support surfaces 15, 16 which diverge towards the bottom. A corresponding support surface is located as an extension of the backrest 8 on a pillion area 20 and is shown by a dashed line 17 in FIG. 3. This means that the attachable seat 4 is open on the bottom and forms a type of bracket 18 which fits the seat of the vehicle 2. FIG. 3 also shows that belts 19 can be attached on the backside of the backrest 8 which make it possible to secure the attachable seat 4 to a luggage carrier or pillion bar behind it. The luggage carrier or pillion bar are not shown.

What is claimed is:

1. An attachable seat adapted to be secured on a vehicle seat having a seat portion and sides, said attachable seat having a backrest; a seat area; a pair of opposed side members joining said backrest and said seat area, said side members extending downwardly below the seat portion to thereby extend over and touch a sufficient part of the sides of the vehicle seat when the attachable seat is mounted on the vehicle seat to thereby restrain the attachable seat from moving transversely of the vehicle seat when it is attached thereto; and a belt for fastening the attachable seat to the vehicle seat, the belt being attached to the side members and adapted to run underneath the vehicle seat when the attachable seat is mounted on the vehicle seat, in a direction transverse to the vehicle seat.

2. The attachable seat according to claim 1, wherein the seat area is flexible.

3. The attachable seat according to claim 1 further comprising another belt which is attached to the side members and which is adapted to be secured around an area in front of and underneath the vehicle seat when the attachable seat is mounted on the vehicle seat.

4. The attachable seat according to claim 3, further comprising a third belt arranged on an outside portion of the backrest and adapted to fasten the attachable seat to a luggage carrier or a pillion bar behind the attachable seat.

5. The attachable seat according to claim 1, wherein the side members diverge from each other as the side members extend downwardly.

6. The attachable seat according to claim 1, wherein the backrest has an extension which partially reaches over the vehicle seat when the attachable seat is mounted on the vehicle seat.

7. The attachable seat according to claim 1, further comprising a handle on an outside portion of each side member.

8. The attachable seat according to claim 1, further comprising a foot rest belt which is transverse to the vehicle seat and which has a foot rest on both sides of the vehicle seat when the attachable seat is mounted on the vehicle seat.

9. The attachable seat according to claim 1, wherein the vehicle seat is a motorcycle seat.

10. In combination, a motorcycle and the attachable seat according to claim 1.

* * * * *